(12) United States Patent
Gintis et al.

(10) Patent No.: US 12,726,426 B2
(45) Date of Patent: Sep. 1, 2026

(54) METHODS, SYSTEMS, AND COMPUTER READABLE MEDIA FOR CHARACTERIZING A TIMESTAMPING BEHAVIOR OF A DEVICE UNDER TEST (DUT)

(71) Applicant: Keysight Technologies, Inc., Santa Rosa, CA (US)

(72) Inventors: Noah Steven Gintis, Westlake Village, CA (US); Alon Regev, Woodland Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 397 days.

(21) Appl. No.: 18/368,005

(22) Filed: Sep. 13, 2023

(65) Prior Publication Data

US 2025/0088444 A1 Mar. 13, 2025

(51) Int. Cl.

*H04L 12/00* (2006.01)
*H04L 43/0852* (2022.01)
*H04L 43/106* (2022.01)

(52) U.S. Cl.

CPC ........ *H04L 43/0852* (2013.01); *H04L 43/106* (2013.01)

(58) Field of Classification Search

CPC ... H04L 43/0852; H04L 43/106; H04L 43/50; H04L 43/08; H04L 41/16
USPC .......................................................... 370/252
See application file for complete search history.

(56) References Cited

U.S. PATENT DOCUMENTS 9,094,307 B1 7/2015 Edsall et al.
9,118,566 B1 8/2015 Mendel et al.
10,313,100 B2 6/2019 Mm
10,554,455 B2 2/2020 Schnizler
11,265,096 B2 3/2022 Bordogna et al.
11,393,507 B1 * 7/2022 Dippon .................... H04N 5/77
11,552,871 B2 1/2023 Sela et al.
11,606,157 B1 3/2023 Wasko et al.
11,652,561 B2 5/2023 Leong et al.
11,671,856 B2 * 6/2023 Chow ..................... H04L 43/50 370/252
11,729,086 B2 * 8/2023 Amadie .................. H04L 12/66 370/252

(Continued)

FOREIGN PATENT DOCUMENTS

JP 2011103595 A 5/2011
WO WO-2013165772 A1 * 11/2013 ............ H04W 48/06

OTHER PUBLICATIONS

Xu L et al., CN115669043A Time delay measuring method, device, equipment, system, storage medium and chip, 12 pages, 2022.*

(Continued)

*Primary Examiner* — Frantz Coby

(57) ABSTRACT

A method for characterizing a timestamping behavior of a device under test (DUT) includes, at a test system, transmitting packets to and receiving packets from the DUT. The test system controls transmit (Tx) timestamping of the packets transmitted to the DUT or receive (Rx) timestamping of the packets received from the DUT. The test system determines based on the Tx and Rx timestamping, timing measurements of the packets transmitted to the DUT and the packets received from the DUT. The test system uses the timing measurements to identify and characterize a timestamping behavior of the DUT.

16 Claims, 8 Drawing Sheets

(56) References Cited

U.S. PATENT DOCUMENTS

| | | | | |
|---|---|---|---|---|
| 11,757,751 | B2 * | 9/2023 | Friman | H04L 43/0852 370/252 |
| 12,381,806 | B2 | 8/2025 | Chakrabarti | |
| 2005/0144342 | A1 | 6/2005 | Renaud et al. | |
| 2006/0074622 | A1 | 4/2006 | Scott et al. | |
| 2007/0088991 | A1 | 4/2007 | Shin et al. | |
| 2011/0292809 | A1 * | 12/2011 | Olgaard | H04L 43/50 370/241 |
| 2014/0269769 | A1 | 9/2014 | Gresham et al. | |
| 2015/0023203 | A1 * | 1/2015 | Odell | H04L 43/0852 370/253 |
| 2019/0044637 | A1 | 2/2019 | Gulstone et al. | |
| 2019/0356897 | A1 | 11/2019 | Karivaradaswamy | |
| 2021/0152271 | A1 | 5/2021 | Bordogna et al. | |
| 2022/0408382 | A1 | 12/2022 | Mysore et al. | |
| 2023/0017710 | A1 * | 1/2023 | Friman | H04L 43/106 |
| 2023/0107148 | A1 * | 4/2023 | Taheri | H04L 41/16 370/252 |
| 2023/0254226 | A1 * | 8/2023 | Haley | H04L 43/08 370/252 |
| 2024/0267317 | A1 | 8/2024 | Ameling et al. | |
| 2025/0080447 | A1 | 3/2025 | Chakrabarti | |

OTHER PUBLICATIONS

Non-Final Office Action for U.S. Appl. No. 18/386,245, filed Sep. 25, 2024.

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, pp. 1-4379, IEEE Std 802.11™-2020.

"IEEE Standard for Ethernet," IEEE Computer Society, LAN/MAN Standards Committee, pp. 1-7025, IEEE Std 802.3™-2022.

"IEEE Standard for a Precision Clock Synchronization Protocol for Networked Measurement and Control Systems," IEEE Instrumentation and Measurement Society, pp. 1-499, IEEE Std 1588™-2019.

Tim Warland, "Understanding Skew in 100GBASE-R4 applications", EE Times, pp. 17 (2011).

Calnex Solutions Ltd., "Implementing IEEE 1588v2 for use in the mobile backhaul," Technical Brief, pp. 1-24, 2009.

Chandra Mallela et al., "Timing models for PTP in Ethernet networks," IEEE Instrumentation and Measurement Soc., Keysight Technologies: Downloaded on May 26, 2023 at 01:47:28 UTC from IEEE Xplore, pp. 1-6.

Ethernet Synchronization, Keysight Technologies, Jun. 24, 2020, 7019-0048.EN pp. 1-207.

"How to Configure DP83867 SFDs," Texas Instruments Application Report—SNLA242—Oct. 2015, pp. 1-7.

"100GE and 40GE PCS Overview," Generic Architecture, Nicholl, IEEE 802.3az, Nov. 2008 Dallas, pp. 1-27.

Notice of Allowance and Fee(s) Due and Examiner-Initiated Interview Summary for U.S. Appl. No. 18/386,245, filed Apr. 2, 2025.

* cited by examiner

600

METHODS, SYSTEMS, AND COMPUTER READABLE MEDIA FOR CHARACTERIZING A TIMESTAMPING BEHAVIOR OF A DEVICE UNDER TEST (DUT)

TECHNICAL FIELD

The subject matter described herein relates to timestamping behaviors. More specifically, the subject matter relates to methods, systems, and computer readable media for characterizing a timestamping behavior of a DUT.

BACKGROUND

Network devices record times of a packet's transmittal and receipt with transmit (Tx) timestamping and receive (Rx) timestamping, respectively. However, there is not a universal standard for where a standard-compliant network device should timestamp a packet in the wire, resulting in a lack of uniformity among network devices measuring when a packet is determined to be transmitted or received. There are currently multiple Institute of Electrical and Electronics Engineers (IEEE) groups which have somewhat conflicting specifications. For example, IEEE 1588-2019 defines the timestamping point as the symbol after Start of Frame Delimiter (SFD), whereas IEEE 802.3 defines the timestamping point as the SFD and IEEE 802.11 defines the timestamping point independent of the SFD. For other types of networks (i.e., not Ethernet or WiFi), the timestamping point is defined by other organizations.

Accordingly, there is a need for characterizing a timestamping behavior of network devices.

SUMMARY

Methods, systems, and computer readable media for characterizing a timestamping behavior of a DUT are disclosed. An example method for characterizing a timestamping behavior of a DUT includes, at a test system, transmitting packets to and receiving packets from the DUT. The method further includes controlling, by the test system, transmit (Tx) timestamping of the packets transmitted to the DUT or receive (Rx) timestamping of the packets received from the DUT. The method further includes determining, by the test system and based on the Tx and Rx timestamping, timing measurements of the packets transmitted to the DUT and the packets received from the DUT. The method further includes using the timing measurements to identify and characterize a timestamping behavior of the DUT.

According to another aspect of the subject matter described herein, controlling the Tx timestamping of packets transmitted to the DUT or the Rx timestamping of the packets received from the DUT includes controlling the Tx timestamping of the packets transmitted to the DUT.

According to another aspect of the subject matter described herein, determining the timing measurements includes determining delay measurements of the packets transmitted to and the packets received from the DUT.

According to another aspect of the subject matter described herein, using the timing measurements to characterize a timestamping behavior of the DUT includes determining a periodicity of the delay measurements and using changes in the periodicity to determine when a physical layer chip causes changes in the Rx timestamping or the Tx timestamping of the DUT.

According to another aspect of the subject matter described herein, using changes in the periodicity to determine when the physical layer chip causes changes in the Rx timestamping or the Tx timestamping of the DUT includes correlating the changes in periodicity with insertion of symbols into a physical layer bit stream.

According to another aspect of the subject matter described herein, correlating the timestamping behavior with the insertion of symbols includes correlating the timestamping behavior with the insertion of lane markers, forward error correction (FEC), and/or parity bits into the physical layer bit stream.

According to another aspect of the subject matter described herein, transmitting packets to the DUT includes transmitting the packets in a manner that causes the DUT to insert the lane markers, FEC bits, and/or parity bits into the physical layer bit stream.

According to another aspect of the subject matter described herein, characterizing the timestamping behavior of the DUT includes characterizing the Tx timestamping behavior of the DUT.

According to another aspect of the subject matter described herein, characterizing the timestamping behavior of the DUT includes characterizing the Rx timestamping behavior of the DUT.

An example system for characterizing a timestamping behavior of a DUT includes a test system configured for transmitting packets to and receiving packets from the DUT. The test system is further configured for controlling transmit (Tx) timestamping of the packets transmitted to the DUT or receive (Rx) timestamping of the packets received from the DUT. The test system is further configured for determining, based on the Tx and Rx timestamping, timing measurements of the packets transmitted to the DUT and the packets received from the DUT. The test system is further configured for using the timing measurements to identify and characterize a timestamping behavior of the DUT.

According to another aspect of the subject matter described herein, controlling the Tx timestamping of packets transmitted to the DUT or the Rx timestamping of the packets received from the DUT includes controlling the Tx timestamping of the packets transmitted to the DUT.

According to another aspect of the subject matter described herein, controlling the Tx timestamping of packets transmitted to the DUT or the Rx timestamping of the packets received from the DUT includes controlling the Rx timestamping of the packets received from the DUT.

According to another aspect of the subject matter described herein, determining the timing measurements includes determining delay measurements of the packets transmitted to and the packets received from the DUT.

According to another aspect of the subject matter described herein, using the timing measurements to characterize a timestamping behavior of the DUT includes determining a periodicity of the delay measurements and using changes in the periodicity to determine when a physical layer chip causes changes in the Rx timestamping or the Tx timestamping of the DUT.

According to another aspect of the subject matter described herein, using changes in the periodicity to determine when the physical layer chip causes changes in the Rx timestamping or the Tx timestamping of the DUT includes correlating the changes in periodicity with insertion of symbols into a physical layer bit stream.

According to another aspect of the subject matter described herein, correlating the timestamping behavior with the insertion of symbols includes correlating the timestamping behavior with the insertion of lane markers, forward error correction (FEC), and/or parity bits into the physical layer bit stream.

According to another aspect of the subject matter described herein, transmitting packets to the DUT includes transmitting the packets in a manner that causes the DUT to insert the lane markers, FEC bits, and/or parity bits into the physical layer bit stream.

According to another aspect of the subject matter described herein, characterizing the timestamping behavior of the DUT includes characterizing the Tx or Rx timestamping behavior of the DUT.

According to another aspect of the subject matter described herein, a non-transitory computer readable medium has stored thereon executable instructions that when executed by at least one processor of at least one computer cause the at least one computer to perform steps including transmitting packets to and receiving packets from the DUT. The non-transitory computer readable medium is further configured for controlling transmit (Tx) timestamping of the packets transmitted to the DUT or receive (Rx) timestamping of the packets received from the DUT. The non-transitory computer readable medium is further configured for determining, based on the Tx and Rx timestamping, timing measurements of the packets transmitted to the DUT and the packets received from the DUT. The non-transitory computer readable medium is further configured for using the timing measurements to identify and characterize a timestamping behavior of the DUT.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which.

DETAILED DESCRIPTION

Figure 1:
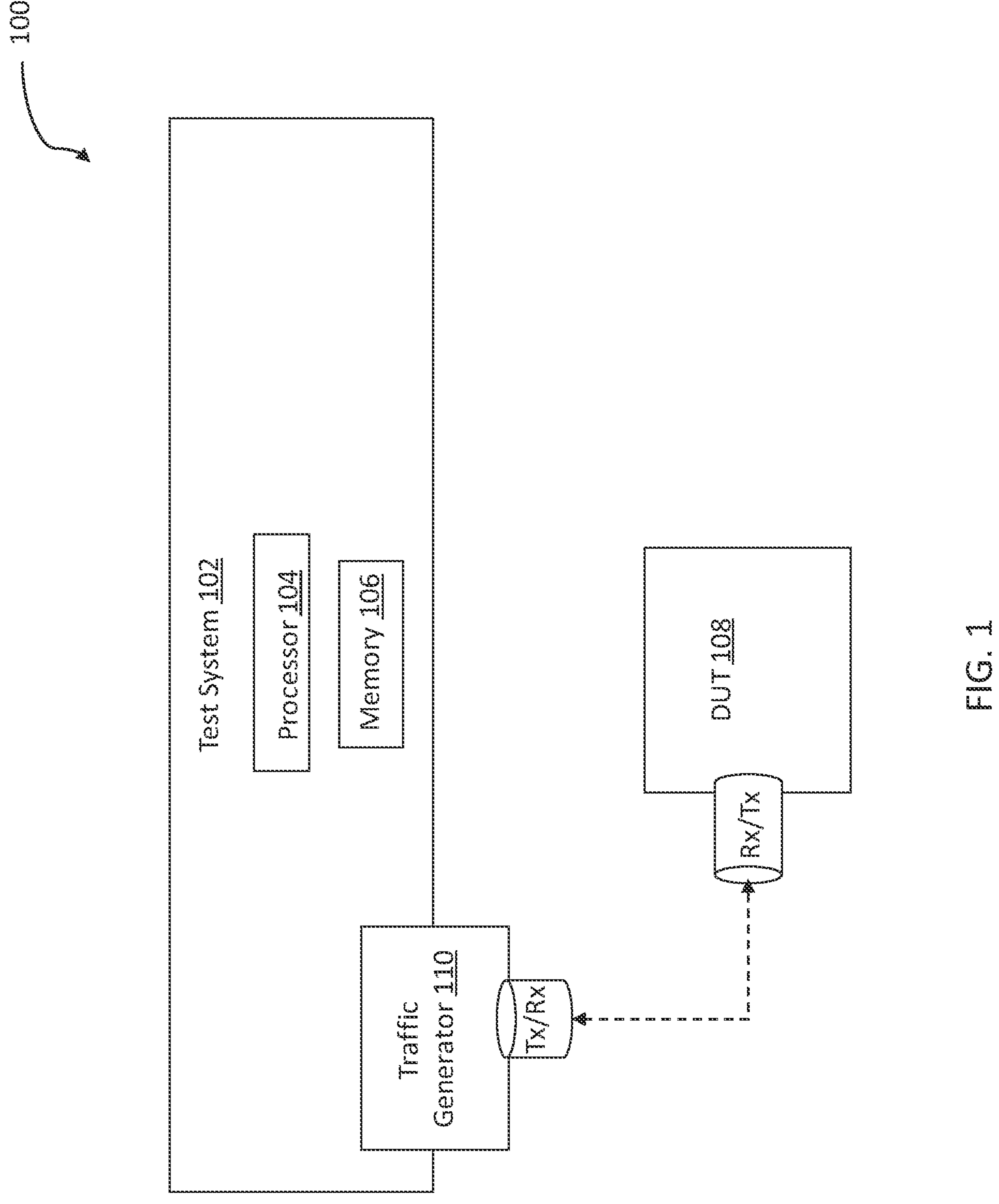
FIG. 1 is a block diagram illustrating an example system for characterizing a timestamping behavior of a DUT.

The subject matter described herein includes methods, systems, and computer readable media for characterizing a timestamping behavior of a DUT. Network devices measure when they transmit a packet and when they receive a packet by timestamping the packet with Tx timestamping and Rx timestamping, respectively. Each network device is programmed to timestamp a packet at a specific location on the packet. In other words, the network device determines that a packet is transmitted or received when the specific location on the packet is transmitted or received. However, the specific location where a given network device timestamps is uncertain unless tested and can vary based on physical layer processing, such as insertion of virtual lane markers into physical layer bitstreams. When transmitting packets, network devices Tx timestamp packets before directing the packets to the physical layer for physical transmission to a receiving network device. At the physical layer, physical layer chips in network devices may insert control symbols into some of the packets, increasing the length of those packets after Tx timestamping and causing a longer measured transmission time for those packets if the receiving network device timestamps the packets at a location after the inserted symbols. Because the specific location that a receiving network device timestamps packets, longer measured transmission times identified as delays caused by inserted controls are indistinguishable from delays caused by unexpected errors.

A test system transmits packets to and/or receives packets from a network device, as the DUT, to characterize a timestamping behavior of the DUT. The test system controls Tx timestamping of the packets it transmits to the DUT and/or Rx timestamping of the packets it receives from the DUT, such as the location of the timestamping on the packets. The test system may adjust the location of its timestamping based on user input. The test system then determines timing measurements of the transmitted packets, such as transmission times defined by the difference between the times of Tx timestamps and Rx timestamps. The test system uses the timing measurements to identify and characterize a timestamping behavior of the DUT. Characterizing timestamping behavior may include determining a range of possible locations of packets where DUT timestamps or determining the specific location of packets where DUT timestamps. The test system may determine delay measurements in packet transmissions and a periodicity of the delay measurements. The test system may use statistical analysis on a large amount of transmitted packets that emulate normal network traffic to determine when a control symbol inserted by the physical layer chip causes changes in the timestamping of the DUT. The test system may control the insertion of control symbols and correlate these insertions with a periodicity or change in periodicity of the delay measurements to characterize the timestamping behavior of the DUT.

FIG. 1 is a block diagram illustrating a system 100 for characterizing a timestamping behavior of a DUT. System 100 includes a test system 102. Test system 102 may emulate a network device configured for sending and receiving packets between another network device. Test system 102 may include at least one processor 104 and memory 106. Test system 102 may include, without limitation, a microcontroller, microprocessor, digital signal processor (DSP)

and/or system on a chip (SoC) as described herein. Test system 102 may include a single computing device operating independently, or may include two or more computing devices operating in concert, in parallel, sequentially or the like; two or more computing devices may be included together in a single computing device or in two or more computing devices. Test system 102 may include one or more central processing units (CPUs). Test system 102 may include a system clock that outputs a current time, which the test system 102 may use for timestamping. Test system 102, using processor 104 and memory 106, may be configured to perform any of the steps described herein.

Test system 102 transmits packets to and receives packets from a DUT 108. The packets transmitted by test system 102 may be generated by a traffic generator 110. Test system 102 may include traffic generator 110 or the traffic generator 110 may be externally connected to test system 102 and may send generated traffic to the test system 102 for the test system 102 to then send to DUT 108. Traffic generator 110 may generate packets that emulate network traffic. An example packet 200 that may be transmitted between test system 102 and DUT 108 is shown in FIG. 2.

Figure 2:
FIG. 2 is a block diagram illustrating an example Ethernet packet.
Figure 2:
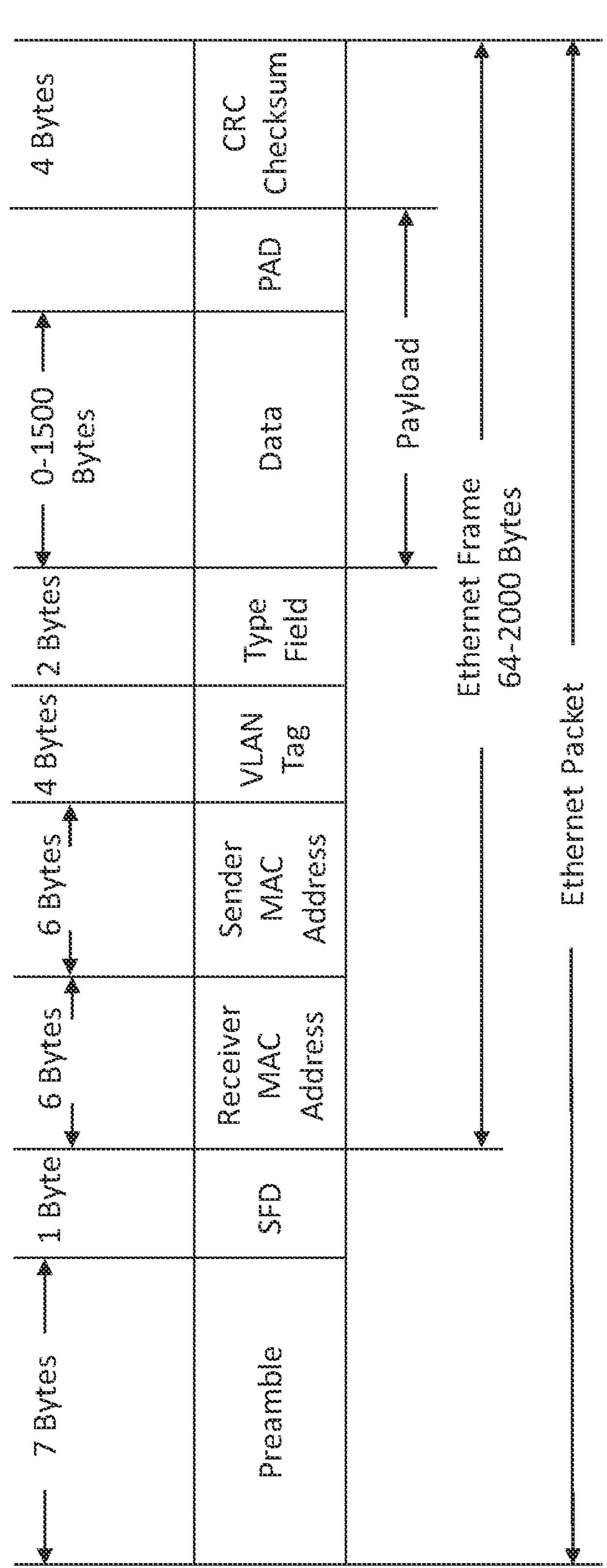

Referring now to FIG. 2, FIG. 2 is a block diagram illustrating an example Ethernet packet, also referred to herein as a packet 200. Packet 200 may include a preamble including seven bytes of data followed by the SFD including one byte. The frame begins after the SFD, which forms the remainder of packet 200. The frame includes a six-byte receiver media access control (MAC) address and a six-byte sender MAC address identifying unique addresses for the destination and source of the packet 200, respectively. Packet 200 may include an optional virtual local area network (VLAN) tag of four bytes if the packet 200 is traveling to or from a port handling more than one VLAN. Packet 200 may further include two bytes identifying a type field followed by a payload with a maximum length of 1500 bytes. The payload may include a padding field of variable length to ensure a minimum length of the payload or frame. The end of packet 200 may include a cyclic redundancy check (CRC) checksum of 4 bytes to detect accidental changes to the transmitted data. Packet 200 may have a maximum length of 2000 bytes.

Figure 3A:
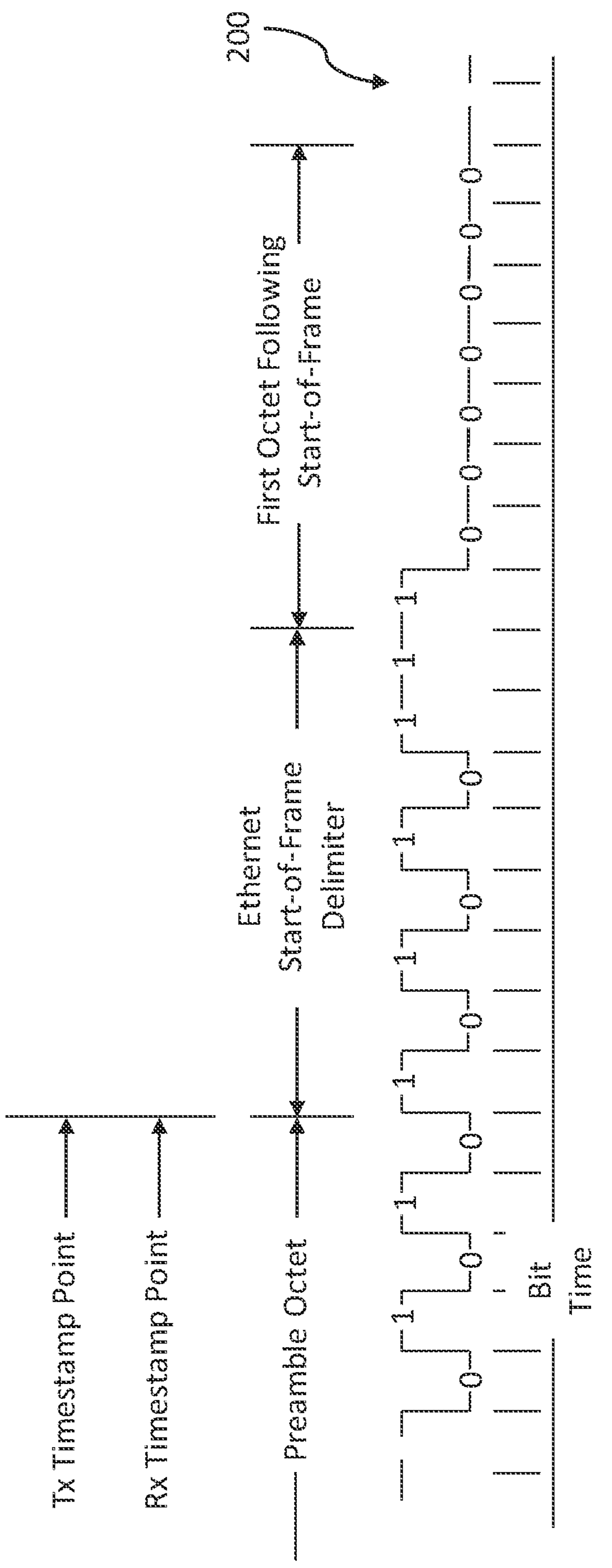
FIG. 3A illustrates timestamping measurement points of a packet.
Figure 3B:
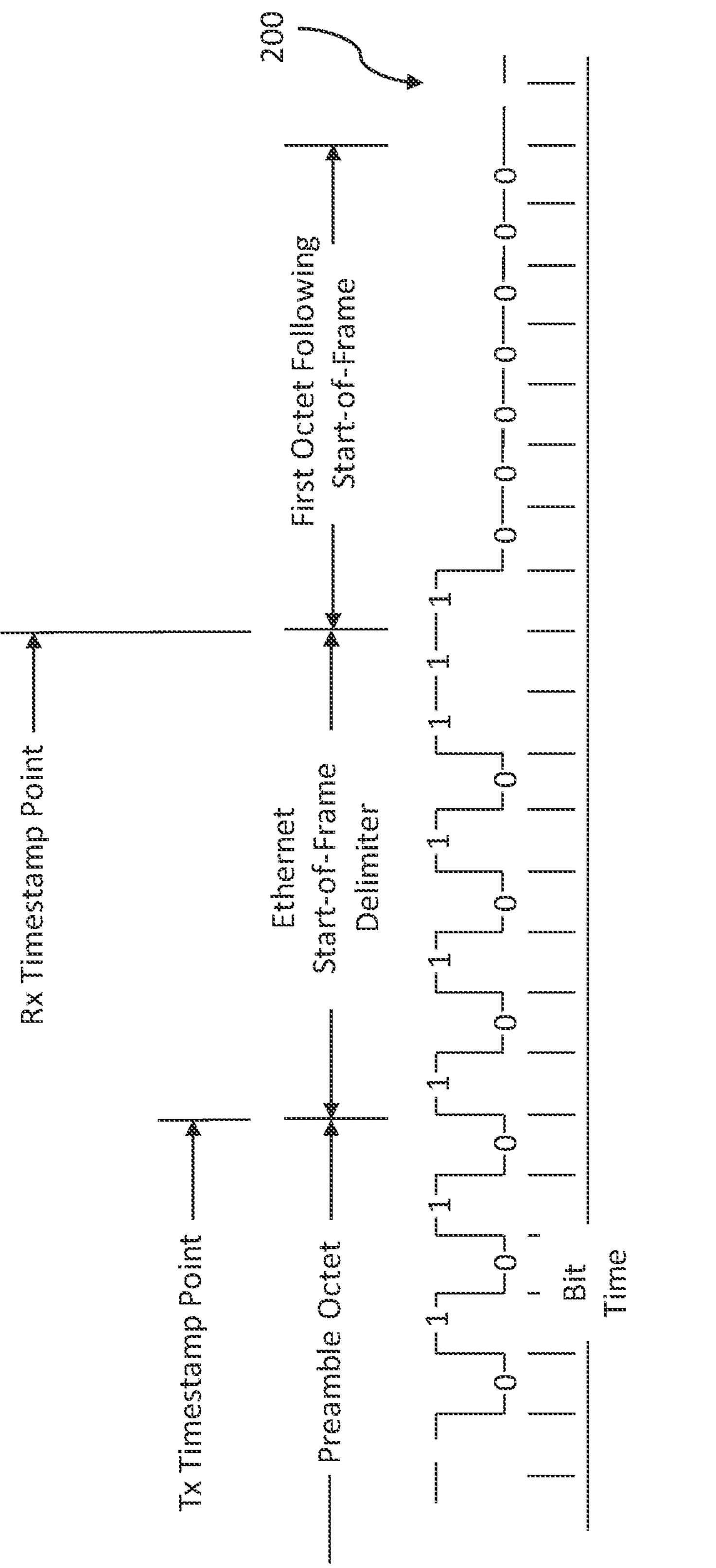
FIG. 3B illustrates timestamping measurement points of a packet.

FIGS. 3A and 3B are diagrams illustrating example scenarios of where a transmit (Tx) timestamp point and a receive (Rx) timestamp point occur with respect to packet 200, showing the corresponding bit time of the packet 200 being transmitted. In FIG. 3A, the Tx timestamp point and the Rx timestamp point occur at the same location of packet 200, namely at the end of the preamble octet and before the SFD. In contrast, FIG. 3B shows an example where the Tx timestamp point and the Rx timestamp point occur at different locations of packet 200. Similar to the example in FIG. 3A, the Tx timestamp point shown in FIG. 3B is at the end of the preamble octet and before the SFD. However, the Rx timestamp point is measured after the SFD rather than before the SFD, indicating that the device transmitting the packet and the device receiving the packet trigger timestamp measurements at different locations of packet 200.

Figure 4A:
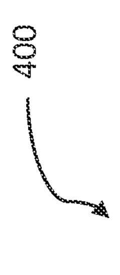
FIG. 4A is a block diagram illustrating a packet transmission.
Figure 4A:
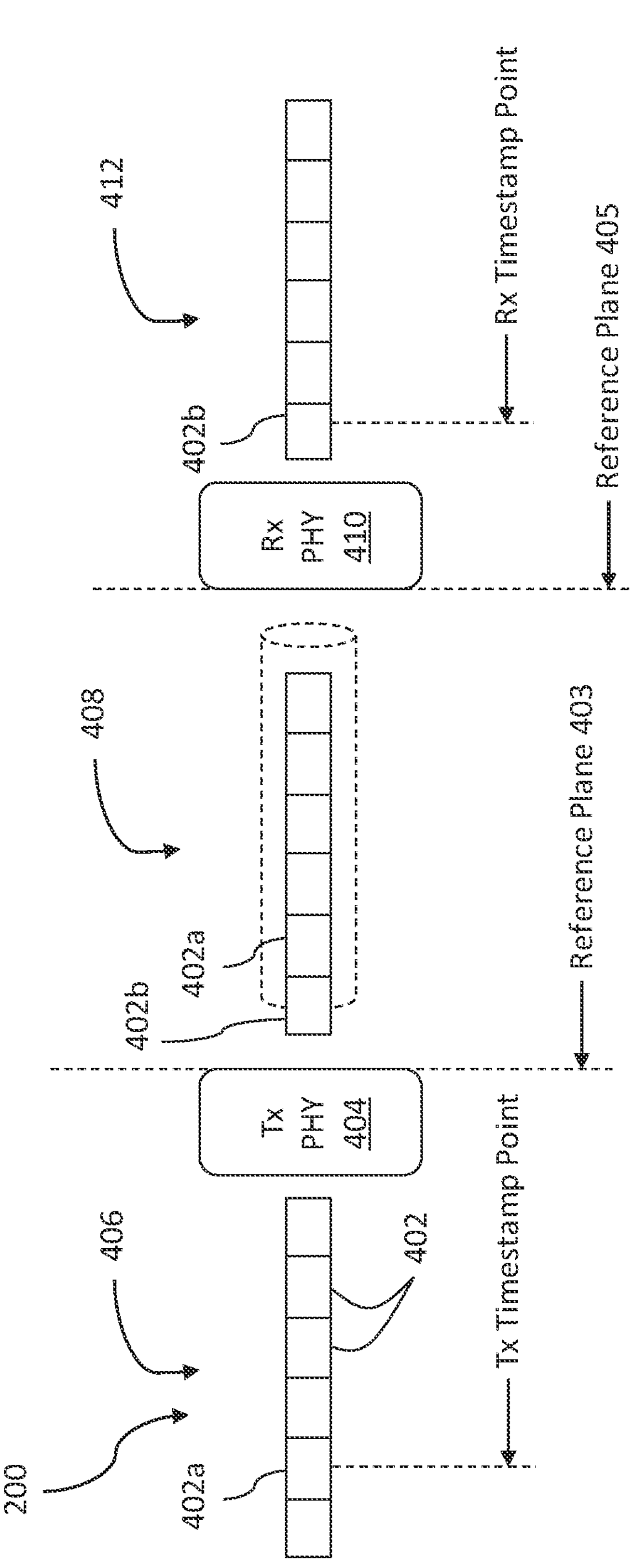
Figure 4B:
FIG. 4B is a block diagram illustrating a packet transmission with an inserted virtual lane marker.
Figure 4B:
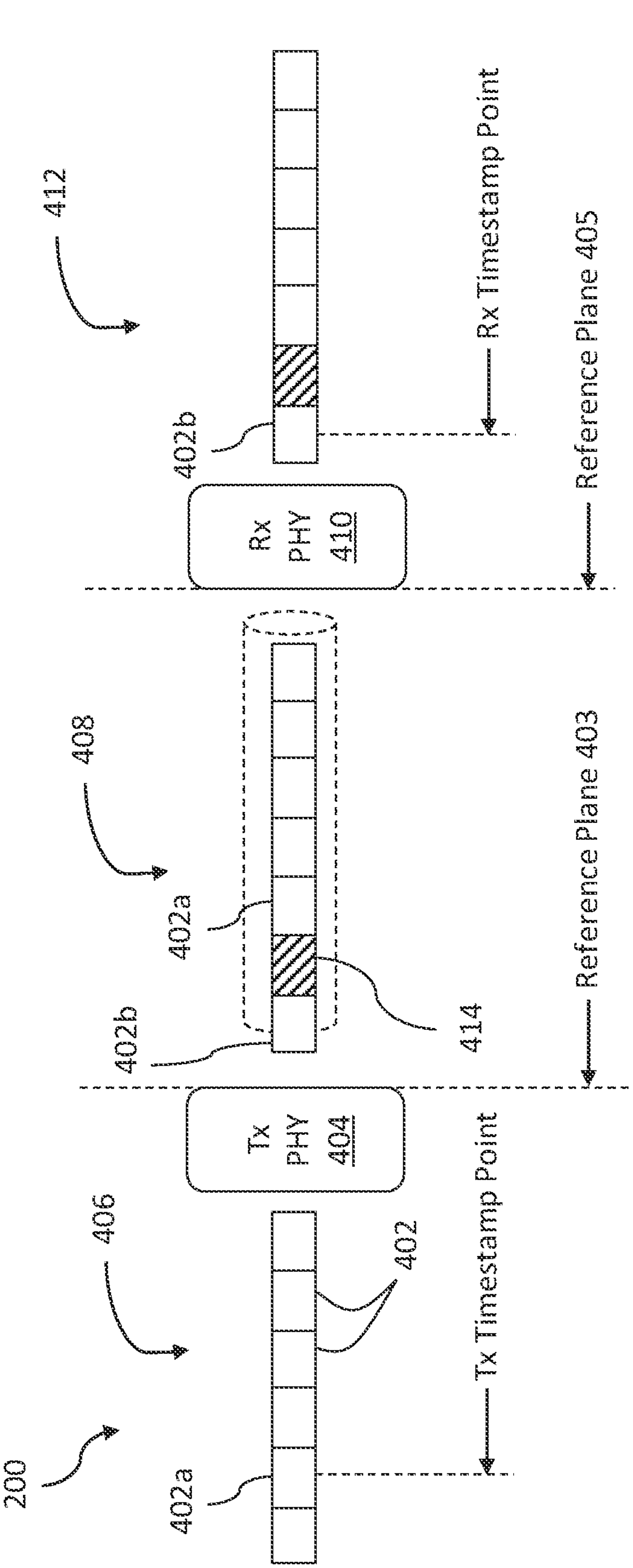

FIGS. 4A and 4B are block diagrams illustrating transmission stages of a stream of bits 402 forming packet 200. In the illustrated examples, a transmitting network device, which may be test system 102 or DUT 108, measures the start of the transmission time of packet 200 by measuring the time with a Tx timestamp when a predetermined location on packet 200, i.e., a Tx timestamp point, passes reference plane 403, which is where the physical layer of the transmitting network device (Tx PHY) 404 connects to the network medium, such as a network cable connection. In this example, Tx timestamp point is at bit 402*a* of the packet 200. Thus, the start of the transmission time represents when the Tx timestamp point, namely bit 402*a*, passes reference plane 403 and enters the network medium. Packet 200 is transmitted from Tx PHY 404 and is an in-flight bit stream 408 in transmission where it is received by a physical layer of a receiving network device (Rx PHY) 410, which may be test system 102 or DUT 108. The receiving network device measures the end of the transmission time with an Rx timestamp representing when a predetermined location on packet 200, i.e., a Rx timestamp point, passes reference plane 405, which is where the network medium connects to Rx PHY 410. Thus, the measured transmission time, i.e., the difference in time between the Tx timestamp and the Rx timestamp, represents the time it takes for packet 200 to pass through the network medium from reference plane 403 to reference plane 405. In this example, the receiving network device timestamps packet 200 at bit 402*b* of packet 200. Assuming in the examples illustrated in FIGS. 4A and 4B that the link between the transmitting and receiving network devices transports data at a rate of 1000 bits/second, which is 1 bit/millisecond, packet 200 in FIG. 4A which comprises six bits 402 is transmitted in six milliseconds. Since the Tx timestamp point at bit 402*a* directly precedes in transmission the Rx timestamp point at bit 402*b*, the measured transmission time is six milliseconds, which is the actual time it takes for packet 200 to transmit, plus additional time it takes after receiving bit 402*a* to receive the bit following the bit 402*a*, namely bit 402*b*. Thus, because the Tx timestamp point and the Rx timestamp point are different locations on packet 200, the measured transmission time is slightly different that the actual transmission time. This difference between measured transmission time and actual transmission time can become larger, as shown in FIG. 4B, when a symbol is added between the Tx timestamp point and the Rx timestamp point in packet 200.

FIG. 4B illustrates a measured transmission time affected by a periodic or intermittent symbol added to packet 200. A periodic or intermittent symbol added to packet 200 may include, without limitation, a lane marker, parity bit, forward error correction, and the like. In the example illustrated in FIG. 4B, the periodic or intermittent symbol added to packet 200 is a virtual lane marker 414. Similar to the example shown in FIG. 4A, the Tx timestamp point is located at bit 402*a* and the Rx timestamp point is located at bit 402*b*. In this example, bit 402*a* can be the SDF of packet 200 and bit 402*b* can be a bit directly after the SDF. After the transmitting network device timestamps packet 200 with the Rx timestamp when bit 402*a* passes reference plane 403, a physical layer chip that implements Tx PHY 404 on the transmitting network device adds virtual lane marker 414 to the packet 200. In this example, virtual lane marker 414 is inserted directly after the SDF and is, therefore, positioned between bit 402*a* and bit 402*b*. As a result, packet 200 is lengthened by the size of virtual lane marker 414 and the actual transmission time is increased based on the size of the virtual lane marker 414. For example, if virtual lane marker 414 is one bit, the actual transmission time will increase from six milliseconds to seven milliseconds. Because the transmitting network device measures the Tx timestamp at bit 402*a* of packet 200 located before virtual lane marker 414 and the receiving network device measures the Rx timestamp at bit 402*b* located after virtual lane marker 414, the measured transmission time is further different from the actual transmission time than the example in FIG. 4A. This measured latency will exhibit jitter if many packets are measured over time. Measured delays in transmission time caused by unexpected errors are indistinguishable from delays resulting from a valid link operational event, such as Tx PHY 404 intentionally adding extra symbols, such as virtual lane markers, parity bits, or forward error corrections, without an understanding of DUT's 108 timestamping behavior.

The transmitting network device may timestamp packet 200 with the Tx timestamp at Tx PHY 404 or before Tx PHY 404, causing the measured start of the transmission time to be slightly before packet 200 actually passes reference plane 403 and enters the network medium. Similarly, the receiving network device may timestamp packet 200 with the Rx timestamp at Rx PHY or after Rx PHY 410, causing the measured completion time of the transmission to be slightly after packet 200 actually passes reference plane 405 and exits the network medium. Thus, the measured transmission time is inflated by the difference in time between the Tx timestamp and when packet 200 actually passes reference plane 403 and the difference in time between the Rx timestamp and when packet 200 actually passes reference plane 405 extends the measured. To obtain an accurate measurement of transmission time using the Tx timestamp and Rx timestamp, the delay through PHY and any other layer in the network device packet 200 travels between when the packet 200 is timestamped with the Tx timestamp and Rx timestamp and passes the reference plane 403 and reference plane 405, respectively, must be determined to a certain accuracy and/or precision.

Figure 5:
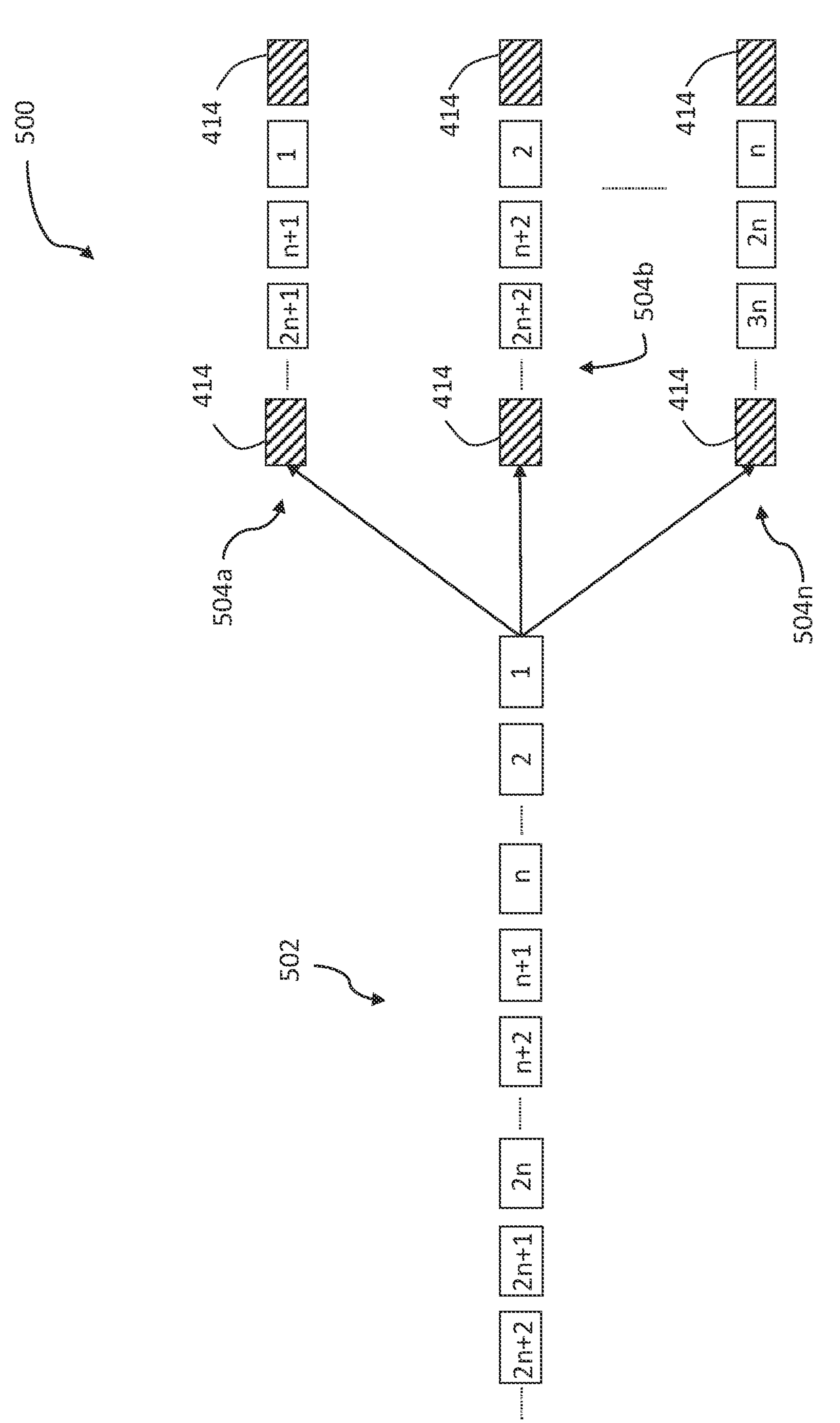
FIG. 5 is a block diagram illustrating packets distributed to virtual lanes using virtual lane markers.

FIG. 5 is a block diagram illustrating packets distributed to virtual lanes 504*a-n* using virtual lane markers 414. A network device, such as test system 102 or DUT 108, may distribute or assign data to various virtual lanes 504*a-n*, in this example 66-bit words 502, at the PHY layer. In FIG. 5, words 502 are numbered chronologically to show how the individual words 502 may be distributed in this example illustration, which implements a simple round robin. An aggregate stream of words 502 are distributed to virtual lanes 504*a-n*. The physical layer chip that implements the PHY layer of the network device adds virtual lane markers 414 to words 502 to identify to which virtual lane the words 502 are assigned. The network device then consolidates words 502 in virtual lanes 504*a-n* into fewer electrical lanes. For example, the network may consolidate words 502 in twenty virtual lanes into ten electrical lanes, then further consolidate the words 502 in the ten electrical lanes into fewer optical lanes, for example four optical lanes resulting in each optical lanes carrying words 502 from multiple virtual lanes. The optical lanes transmit words 502 and virtual lane markers 414 grouped into packets to a receiving network device, which then redistributes the words 502 into virtual lanes using the virtual lane markers 414.

Referring again to FIG. 1, test system 102 is configured for determining, based on Tx timestamping and Rx timestamping, timing measurements of the packets transmitted to DUT 108 and the packets received from the DUT 108. Test system 102 and DUT 108 are configured for measuring when they transmit and receive packets by creating Tx and Rx timestamps when a particular location of each of the packets is transmitted and received, respectively. Test system 102 include at least one port to transmit and receive packets, wherein each port of the test system 102 may be connected to a port on DUT 108 for bidirectional communication. Each port of test system 102 includes a PHY. Test system 102 may transmit packets and create Tx timestamps at the same port that the test system 102 receives packets and creates Rx timestamps. Likewise, DUT 108 may transmit packets and create Tx timestamps at the same port that the DUT 108 receives packets and creates Rx timestamps. DUT 108 may receive a packet from the test system 102, add data or metadata to the packet containing the Rx timestamp and Tx timestamp (for the return transmission), and send the packet back to the test system 102. DUT 108 may terminate a packet received from test system 102, rather than returning the packet to the test system 102, and implement a higher layer protocol, for example Precision Time Protocol (PTP).

DUT 108 is configured to timestamp packets at a specific location of the packets it transmits and receives. However, it is not possible to know where the specific location is without testing. DUT 108 could timestamp, for example, at the symbol directly before SFD, at the SFD, at the symbol directly after SFD, or another location on the packets. If test system 102 and DUT 108 timestamp at different locations of the packets transmitted between them, a measured transmission time will differ by a consistent amount from the actual time it takes for packets to be transmitted between the test system 102 and the DUT 108 provided the Tx PHY does not insert any symbols to the packets. For example, if the Tx timestamp point by the transmitting network device is at the symbol or bit before the SFD and the Rx timestamp point by the receiving network device is at the symbol or bit following the SFD, then the measured transmission time with consistently be longer than the actual time of transmission by the additional time taken to transmit the SFD. However, when Tx PHY inserts a symbol into packets, such as virtual lane marker 414 shown in FIG. 4B, then the measured transmission time is longer if the receiving network device timestamps at a location after the inserted symbols by the transmission time of the inserted symbol. Test system 102 may determine the longer measured transmission time to be a delay measurement of a transmitted packet.

Test system 102 may determine delay measurements of the packets transmitted to and the packets received from DUT 102. Test system 102 may compare a measured transmission time, defined as the difference in time between the Tx and Rx timestamps, of one or more packets to a standard transmission time. A standard transmission time may be a specified transmission time or range of transmission times that is acceptable or expected for a packet transmission, which may be determined by test system 102 based on transmission times of previously transmitted packets or predefined transmission times. Standard transmission times may be specific to packet attributes, such as size. For example, test system 102 may compare a transmission time of a packet to a standard transmission time, which may be stored in a table or database, with attributes comparable to the transmitted packet. Test system 102 may determine delay measurements of packets based on the transmission times of packets exceeding comparable standard transmission times.

Test system 102 may determine a periodicity of the delay measurements and use changes in the periodicity to determine when a physical layer chip causes changes in the Rx timestamping and/or Tx timestamping of DUT 108, such as the transmission time delay caused by virtual lane marker 414 shown in FIG. 4B. A physical layer (PHY) behavior, such as adding or removing streams of symbols such as lane markers, symbols identifying the start of forward error correction (FEC), and/or FEC parity bits encoded as symbols into the physical layer bit stream may expose the timestamping behavior of DUT 108. Test system 102 may correlate the timestamping behavior with the insertion of lane markers, forward error correction (FEC), and/or parity bits into the physical layer bit stream. Test system 102 may transmit numerous packets to and/or receive numerous packets from DUT 108 and, using statistical deductions, determine that a periodic measurement is caused by a physical layer chip by matching the periodic measurement of the delay measurement to the statistical frequency of an event. For example, test system 102 may identify a delay measurement occurring once out of every five million bits, match the delay measurement to the same or approximate statistical frequency that a physical chip layer inserts a lane marker, and determine that the delay measurement is caused by a lane marker being added by the physical layer chip. As another example, 25G Ethernet implements Reed Solomon Forward Error Correction (RS-FEC) wherein each 5140 bits of 256B257B is appended with 140 parity bits and the resulting bit stream is scrambled and converted to symbols before transmission. PHY may insert 140 bits of 256B257B encoded data with the RS-FEC, and test system 102 may match the frequency of the delay measurement to the statistical frequency of the inserted 140 bits of 256B257B encoded data. Test system 102 may include in memory 106 or a connected database a table of statistical frequencies to compare to determined periodicities of delay measurements.

In addition to or instead of sending to and/or receiving from DUT 108 a large amount of packets emulating network traffic to detect periodic measurements of delays that normally occur in network traffic, the test system 102 may change the normal occurrence that the physical layer chip inserts symbols in packets. Test system 102 may transmit the packets in a manner that causes DUT 108 to insert symbols into the physical layer bit stream, such as the lane markers, symbols identifying the start of the FEC, and/or FEC parity bits encoded as symbols. Test system 102, specifically the PHY inside test system 102, may control the location on the packet where the physical layer chip inserts symbols. Test system 102 may correlate the changes in periodicity with the insertion of symbols into a physical layer bit stream.

Test system 102 can control Tx timestamping of the packets transmitted to DUT 108 and/or Rx timestamping of the packets received from the DUT 108. Test system 102 may control a location on the packets where it measures a transmit time with Tx timestamping. Similarly, test system 102 may control a location on the packets where it measures a receive time with Rx timestamping. Test system 102 may adjust Tx timestamping and/or Rx timestamping to be, for example, at the symbol directly before SFD, at the SFD, at the symbol directly after SFD, or another location on the packets. Test system 102 may adjust the location of Tx and Rx timestamping based on user input. Test system 102 may be configured to measure multiple Tx and/or Rx timestamps at different locations on the same packet, which may reduce the amount of packets required to send between the test system 102 and DUT 108 to characterize the timestamp behavior of the DUT 108. Test system 102 may correlate changes in periodicity with changes in the location that the test system 102 timestamps packets.

Test system 102 uses the determined timing measurements to identify and characterize a timestamping behavior of DUT 108. Characterizing a timestamp behavior of DUT 108 may include determining that the DUT's 108 timestamping is within a certain range of locations or is not within a certain range of locations, for example that the DUT 108 timestamps at or after the SFD but not before the SFD. Characterizing a timestamp behavior of DUT 108 may further include determining a specific location the DUT 108 timestamps of packets, for example determining that the DUT 108 timestamps at the SFD of packets. Test system 102 may characterize a timestamping behavior of DUT 108 by the determined periodicity of the delay measurements and using changes in the periodicity to determine when a physical layer chip causes changes in the timestamping behavior of the DUT 108.

Figure 6:
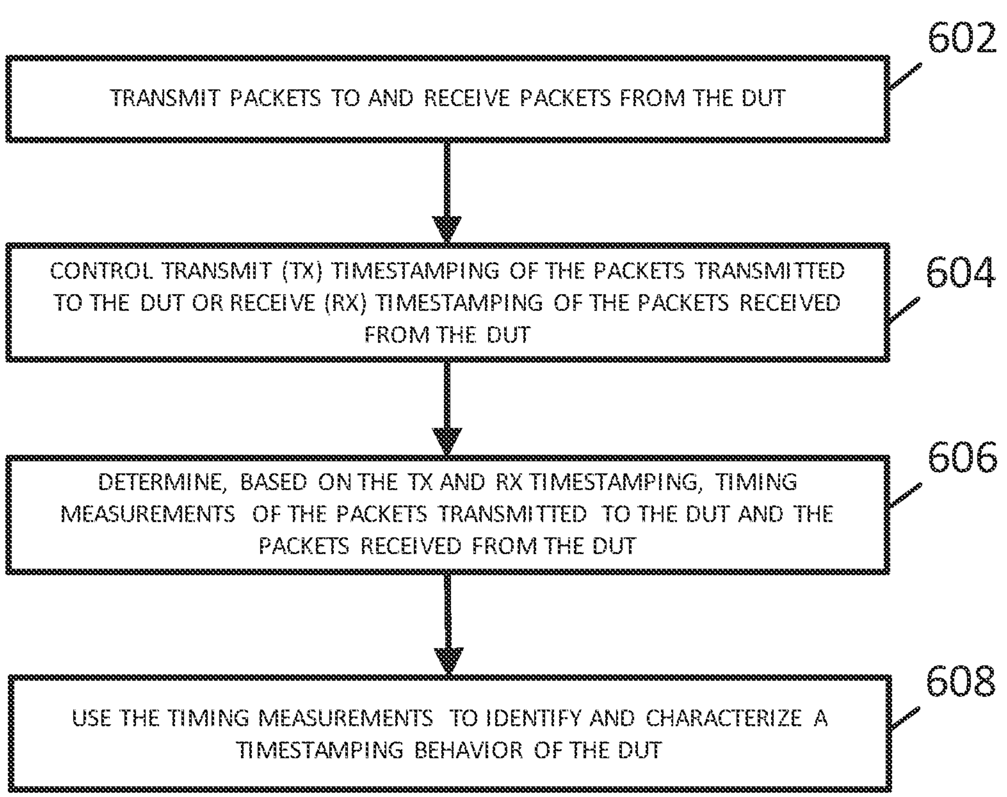
FIG. 6 is a flow diagram illustrating an example method for characterizing a timestamping behavior of a DUT.

FIG. 6 is a flow diagram illustrating an example method 600 for characterizing a timestamping behavior of a DUT. At step 602, a test system transmits packets to and receives packets from the DUT. The test system may transmit the packets in a manner that causes the DUT to insert the lane markers, FEC bits, and/or parity bits into the physical layer bit stream.

At step 604, the test system controls transmit (Tx) timestamping of the packets transmitted to the DUT or receive (Rx) timestamping of the packets received from the DUT.

At step 606, the test system determines, based on the Tx and Rx timestamping, timing measurements of the packets transmitted to the DUT and the packets received from the DUT. Determining the timing measurements may include determining delay measurements of the packets transmitted to and the packets received from the DUT.

At step 608, the test system uses the timing measurements to identify and characterize a timestamping behavior of the DUT. The test system may characterize the Tx timestamping and/or Rx timestamping behavior of the DUT. The test system may determine a periodicity of the delay measurements and use changes in the periodicity to determine when a physical layer chip causes changes in the Rx timestamping or Tx timestamping of the DUT. The test system may correlate the changes in periodicity with insertion of symbols into a physical layer bit stream. For example, the test system may correlate the timestamping behavior with the insertion of lane markers, forward error correction (FEC), and/or parity bits into the physical layer bit stream.

It will be appreciated that method 600 is for illustrative purposes and that different and/or additional actions may be used. It will also be appreciated that various actions described herein may occur in a different order or sequence. It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for characterizing a timestamping behavior of a device under test (DUT), the method comprising:

at a test system, transmitting packets to and receiving packets from the DUT;

controlling, by the test system, transmit (Tx) timestamping of the packets transmitted to the DUT or receive (Rx) timestamping of the packets received from the DUT;

determining, by the test system and based on the Tx and Rx timestamping, timing measurements of the packets transmitted to the DUT and the packets received from the DUT, wherein determining the timing measurements includes determining delay measurements of the packets transmitted to and the packets received from the DUT; and using the timing measurements to identify and characterize a timestamping behavior of the DUT, wherein using the timing measurements to characterize a timestamping behavior of the DUT includes determining a periodicity of the delay measurements and using changes in the periodicity to determine when a physical layer chip causes changes in the Rx timestamping or Tx timestamping of the DUT.

2. The method of claim 1 wherein controlling the Tx timestamping of packets transmitted to the DUT or the Rx timestamping of the packets received from the DUT comprises controlling the Tx timestamping of the packets transmitted to the DUT.

3. The method of claim 1 wherein controlling the Tx timestamping of packets transmitted to the DUT or the Rx timestamping of the packets received from the DUT comprises controlling the Rx timestamping of the packets received from the DUT.

4. The method of claim 1 wherein using changes in the periodicity to determine when the physical layer chip causes changes in the Rx timestamping or Tx timestamping of the DUT includes correlating the changes in periodicity with insertion of symbols into a physical layer bit stream.

5. The method of claim 4 wherein correlating the timestamping behavior with the insertion of symbols includes correlating the timestamping behavior with the insertion of lane markers, forward error correction (FEC), and/or parity bits into the physical layer bit stream.

6. The method of claim 5 wherein transmitting packets to the DUT includes transmitting the packets in a manner that causes the DUT to insert the lane markers, FEC bits, and/or parity bits into the physical layer bit stream.

7. The method of claim 1 wherein characterizing the timestamping behavior of the DUT includes characterizing the Tx timestamping behavior of the DUT.

8. The method of claim 1 wherein characterizing the timestamping behavior of the DUT includes characterizing the Rx timestamping behavior of the DUT.

9. A system for characterizing a timestamping behavior of a device under test (DUT), the system comprising:

a test system configured for:

transmitting packets to and receiving packets from the DUT;

controlling transmit (Tx) timestamping of the packets transmitted to the DUT or receive (Rx) timestamping of the packets received from the DUT;

determining, based on the Tx and Rx timestamping, timing measurements of the packets transmitted to the DUT and the packets received from the DUT, wherein determining the timing measurements includes determining delay measurements of the packets transmitted to and the packets received from the DUT; and using the timing measurements to identify and characterize a timestamping behavior of the DUT, wherein using the timing measurements to characterize a timestamping behavior of the DUT includes determining a periodicity of the delay measurements and using changes in the periodicity to determine when a physical layer chip causes changes in the Rx timestamping or Tx timestamping of the DUT.

10. The system of claim 9 wherein controlling the Tx timestamping of packets transmitted to the DUT or the Rx timestamping of the packets received from the DUT comprises controlling the Tx timestamping of the packets transmitted to the DUT.

11. The system of claim 9 wherein controlling the Tx timestamping of packets transmitted to the DUT or the Rx timestamping of the packets received from the DUT comprises controlling the Rx timestamping of the packets received from the DUT.

12. The system of claim 11 wherein using changes in the periodicity to determine when the physical layer chip causes changes in the Rx timestamping or the Tx timestamping of the DUT includes correlating the changes in periodicity with insertion of symbols into a physical layer bit stream.

13. The system of claim 12 wherein correlating the timestamping behavior with the insertion of symbols includes correlating the timestamping behavior with the insertion of lane markers, forward error correction (FEC), and/or parity bits into the physical layer bit stream.

14. The system of claim 13 wherein transmitting packets to the DUT includes transmitting the packets in a manner that causes the DUT to insert the lane markers, FEC bits, and/or parity bits into the physical layer bit stream.

15. The system of claim 9 wherein characterizing the timestamping behavior of the DUT includes characterizing the Tx or Rx timestamping behavior of the DUT.

16. A non-transitory computer readable medium having stored thereon executable instructions that when executed by at least one processor of at least one computer cause the at least one computer to perform steps comprising:

transmitting packets to and receiving packets from the DUT;

controlling transmit (Tx) timestamping of the packets transmitted to the DUT or receive (Rx) timestamping of the packets received from the DUT;

determining, based on the Tx and Rx timestamping, timing measurements of the packets transmitted to the DUT and the packets received from the DUT, wherein determining the timing measurements includes determining delay measurements of the packets transmitted to and the packets received from the DUT; and using the timing measurements to identify and characterize a timestamping behavior of the DUT, wherein using the timing measurements to characterize a timestamping behavior of the DUT includes determining a periodicity of the delay measurements and using changes in the periodicity to determine when a physical layer chip causes changes in the Rx timestamping or Tx timestamping of the DUT.

* * * * *